Nov. 2, 1965   W. R. C. GEARY   3,215,120
HOLDING AND CONVEYING APPARATUS FOR FACILITATING
THE TREATMENT OF ANIMALS
Filed Feb. 6, 1961   9 Sheets-Sheet 7

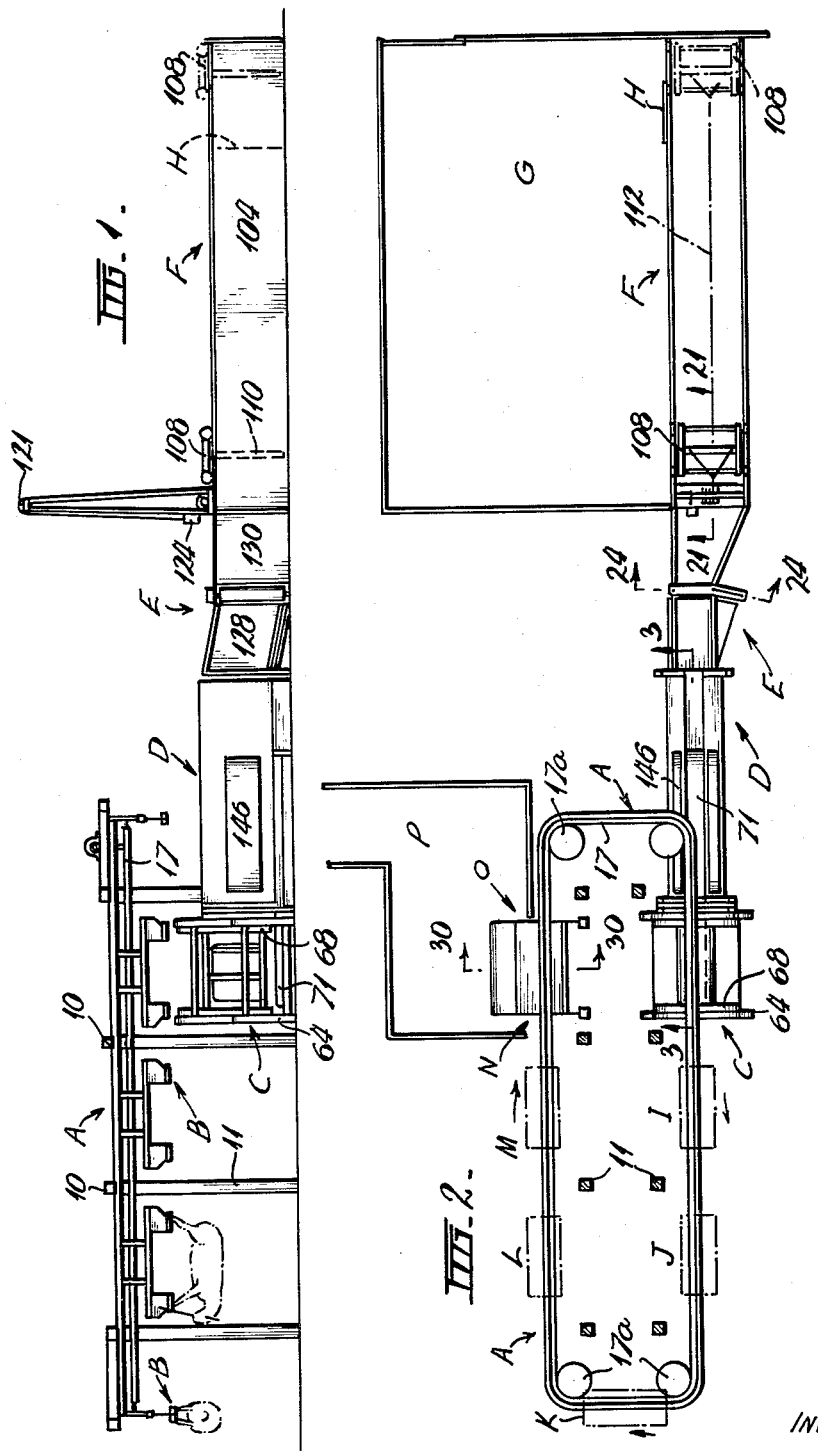

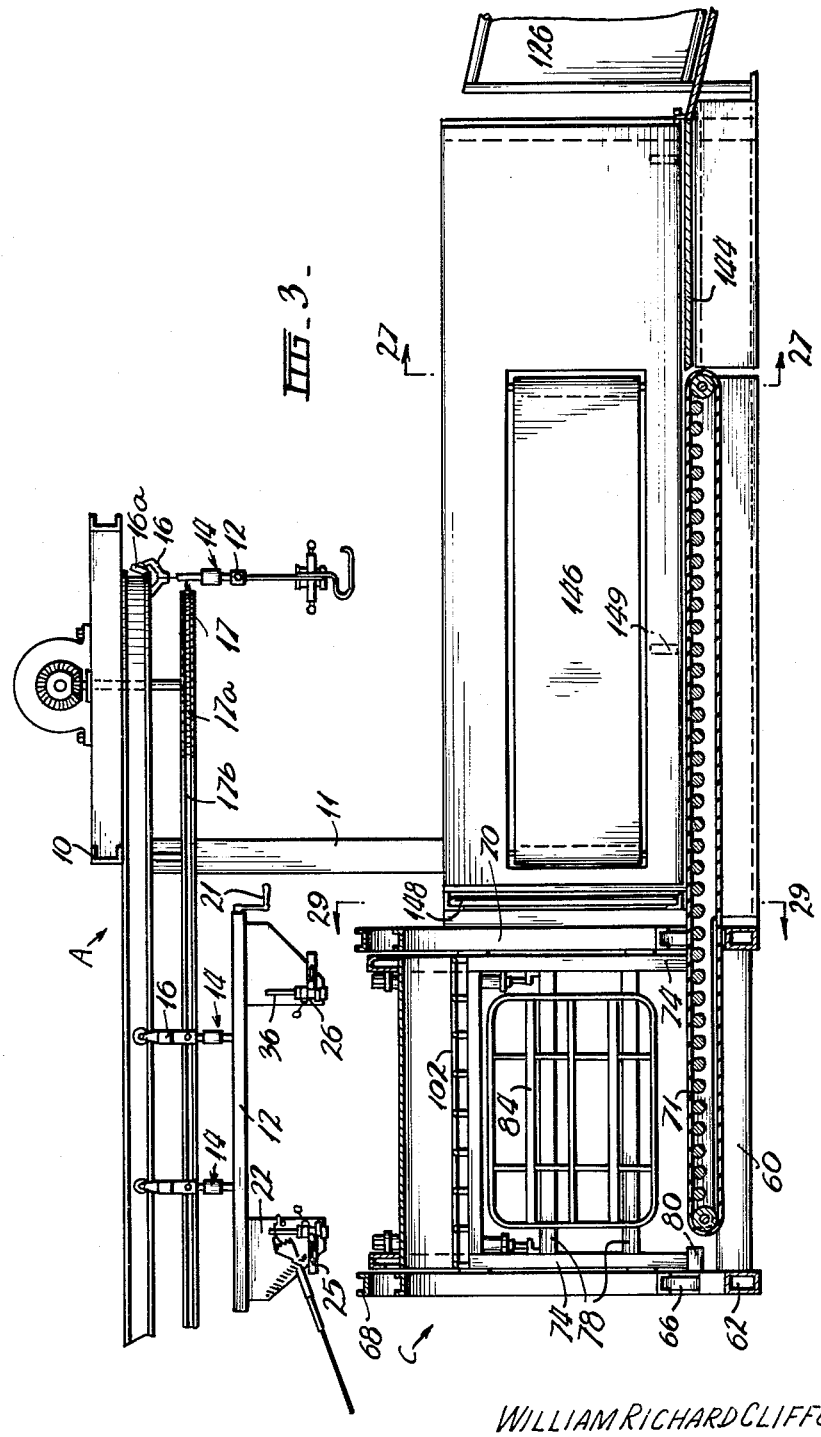

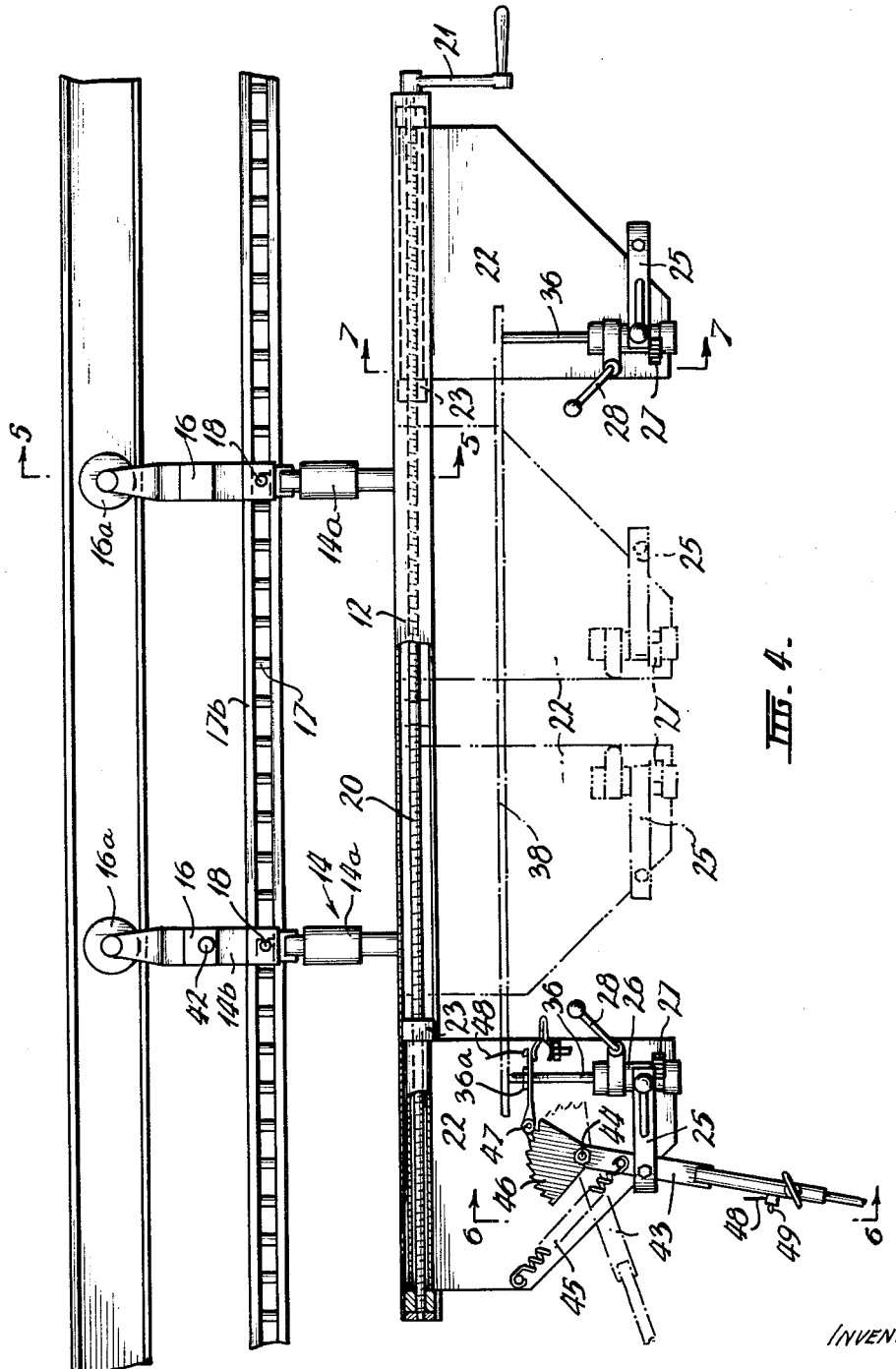

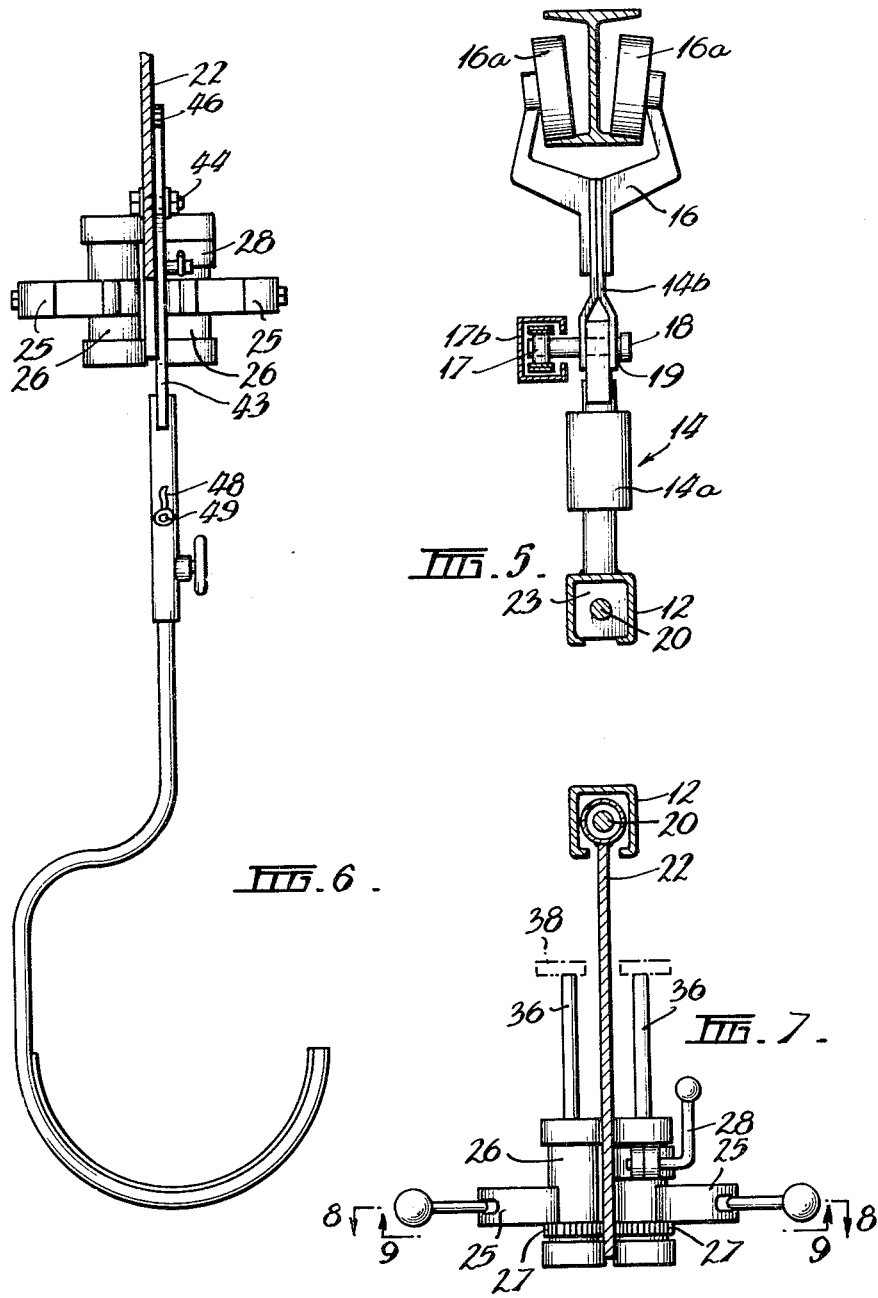

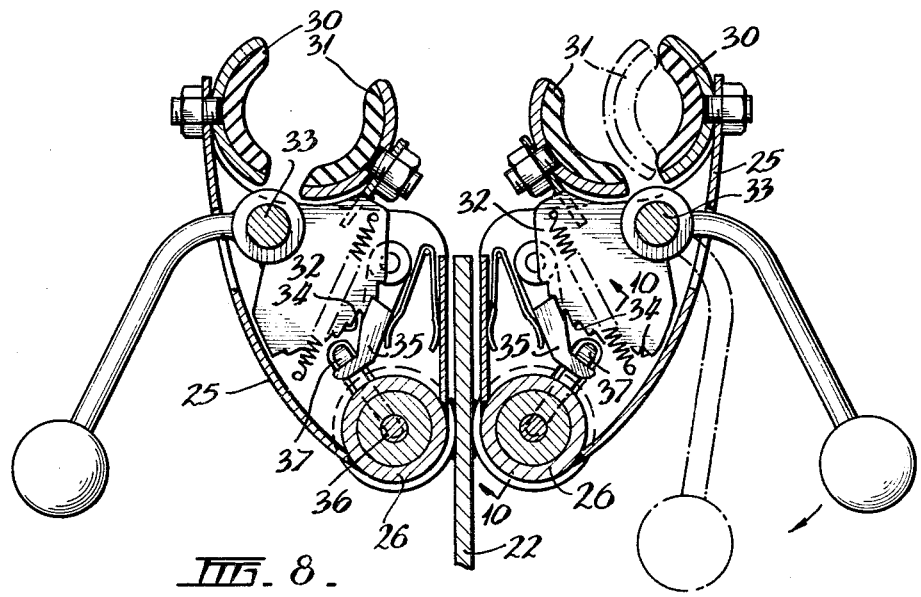
FIG. 8.
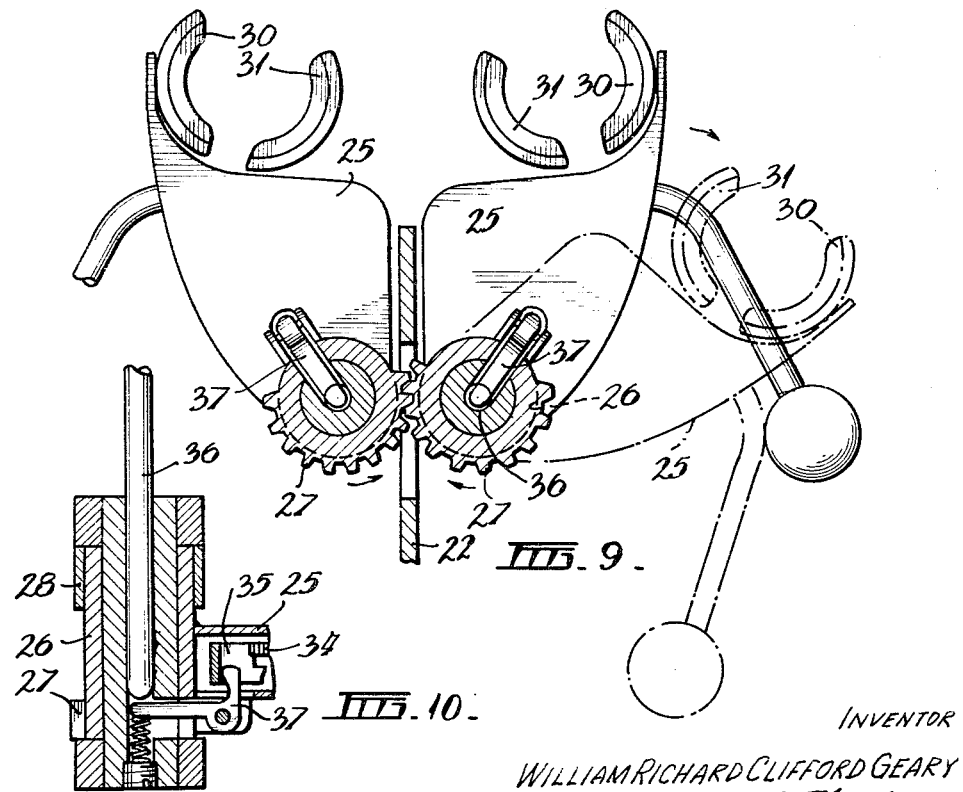
FIG. 9.
FIG. 10.
INVENTOR
WILLIAM RICHARD CLIFFORD GEARY
BY Irwin S. Thompson
ATTY.

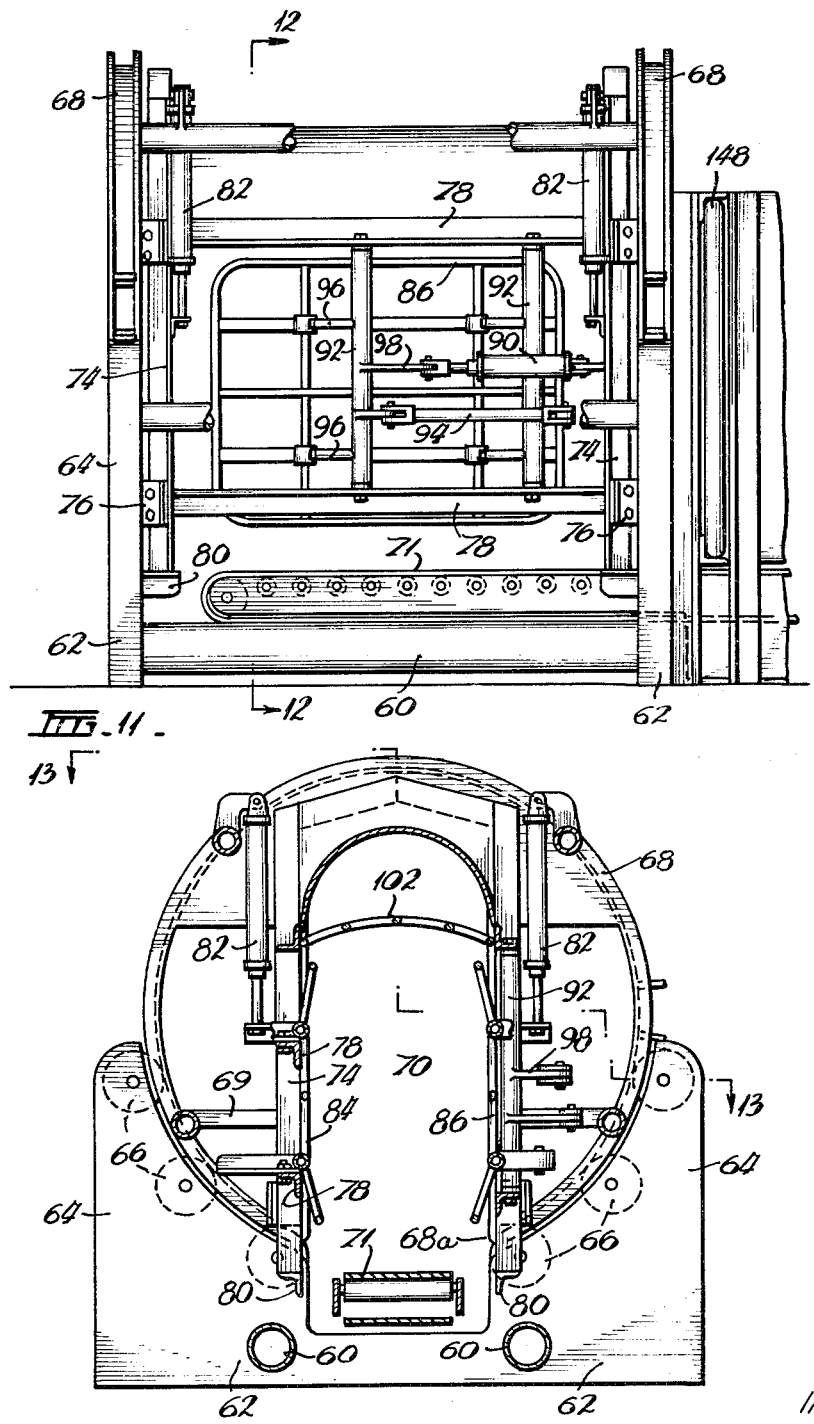

INVENTOR
WILLIAM RICHARD CLIFFORD GEARY
By Irwin S. Thompson
ATTY.

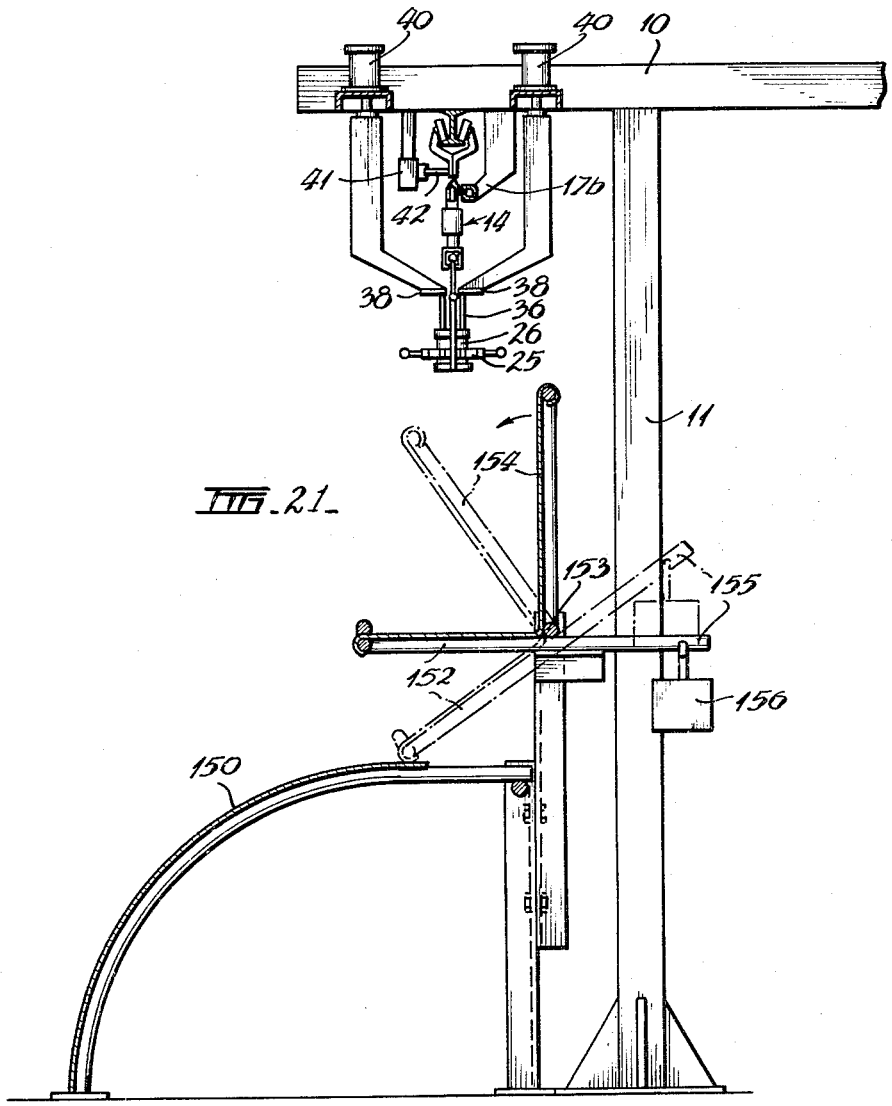

United States Patent Office 3,215,120
Patented Nov. 2, 1965

3,215,120
HOLDING AND CONVEYING APPARATUS FOR FACILITATING THE TREATMENT OF ANIMALS
William Richard Clifford Geary, 1a Bibby Court, Moorabbin, Victoria, Australia
Filed Feb. 6, 1961, Ser. No. 87,273
Claims priority, application Australia, Feb. 9, 1960, 57,306/60
8 Claims. (Cl. 119—98)

This invention relates to apparatus for facilitating the performance of shearing and/or other operations on sheep or other quadruped animals hereinafter shortly termed "animals."

It is usual to subject sheep periodically to some or all of the operations of shearing, crutching, wool classing, weighing, dipping, jetting, vaccinating, mulesing, branding, dagging, drenching and foot-paring. In addition, artificial insemination of ewes is sometimes performed.

The foregoing operations are usually carried out manually and much time is expended in selecting, catching, positioning, restraining and releasing the individual animals, so that the treatment rate is comparatively low. One broad objective of this invention therefore is to provide a method and apparatus whereby the treatment rate may be significantly increased.

The invention includes apparatus comprising an elevated track, at least one carriage supported on the track for movement therealong and spaced means on the carriage releasably engaging the four legs of an animal, thereby to suspend the latter in inverted condition below the carriage.

Preferably, the animal, while supported in the aforesaid manner, is moved, head foremost, to a plurality of successive treatment positions and a plurality of carriages are preferably provided in order that the animals suspended therefrom may be moved in succession to the said treatment positions.

Each carriage also preferably includes a retractable support and guard for the head of the animal.

All of the aforesaid sheep treatment operations, with the possible exception of drenching, can be advantageously carried out while the animal is inverted and suspended by its legs, whereby, among other things, it is suitably restrained against excessive uncontrolled movements.

Preferably, the carriage is so constructed that clamps for the four legs of the animal may be released substantially simultaneously and the invention provides means whereby the animals are released automatically at a predetermined unloading station or position in the path of movement of the carriage. Likewise, provision is made for retracting the head support and guard before or as the animal is released.

More particularly, the aforesaid elevated track is preferably endless and extends above animal loading and unloading stations arranged at a suitable distance apart and above suitable treatment apparatus arranged at a plurality of further stations or positions located between the loading and unloading stations.

Drive means are preferably provided for moving the carriages along the track and provision is preferably made whereby the movement of each carriage may be arrested independently of the other carriages.

Apparatus for inverting the animals is preferably arranged at or near the said loading station, while means for restoring the animals to the erect position on the floor are preferably provided at the unloading position or station. Preferably, the inverting apparatus is also adapted to elevate the animal to a position at which its legs may be conveniently attached to the carriage clamps.

The aforesaid means for restoring the animals to the erect position preferably comprise a pivoted platform or table which is arranged to swing downwards when an animal is deposited on its back thereon, whereby the animal is discharged on its side onto a slide which directs it feet-first onto the floor.

One preferred form of the invention is hereinafter more fully described, with reference to the accompanying drawings, in which:

FIGURE 1 is a view in side elevation of a sheep treatment plant according to the invention.

FIGURE 2 is a view in plan of the apparatus shown in FIGURE 1.

FIGURE 3 is a view in sectional elevation taken on the line 3—3 of FIGURE 2 and is drawn to a larger scale.

FIGURE 4 is a view in side elevation of a sheep carriage.

FIGURES 5, 6 and 7 are views in sectional end elevation taken respectively on the lines 5—5, 6—6, and 7—7 of FIGURE 4.

FIGURE 8 is a view in sectional plan taken on the line 8—8 of FIGURE 7.

FIGURE 9 is an inverted sectional plan view taken on the line 9—9 of FIGURE 7.

FIGURE 10 is a sectional view taken on the line 10—10 of FIGURE 8.

FIGURE 11 is a view in side elevation of an inverting cradle.

FIGURE 12 is a view in sectional end elevation taken on the line 12—12 of FIGURE 11.

Figure 13:
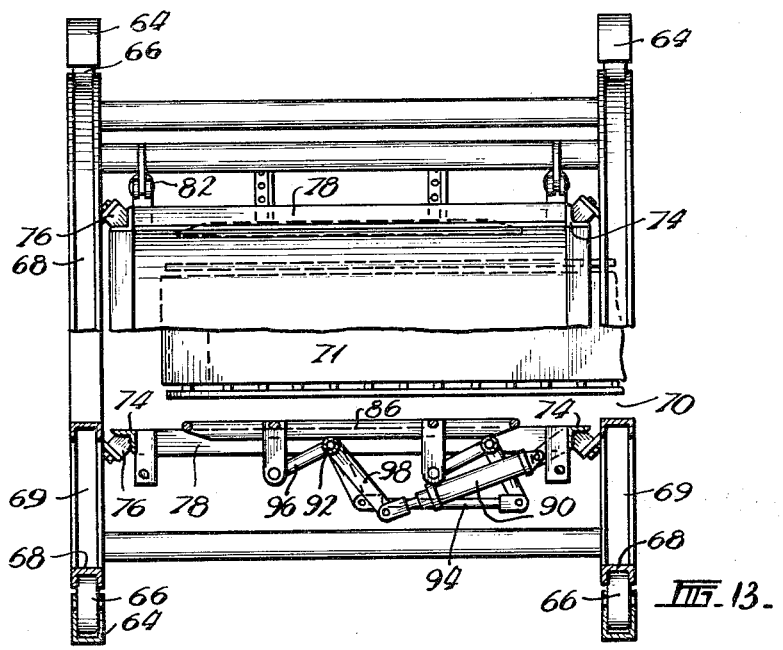

FIGURE 13 is a view in sectional plan taken on the line 13—13 of FIGURE 12.

Figure 14:
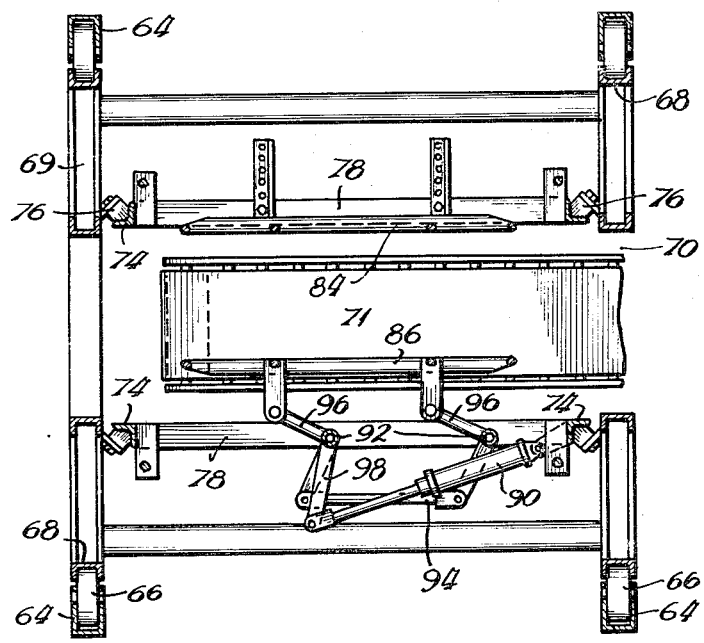
Figure 15:
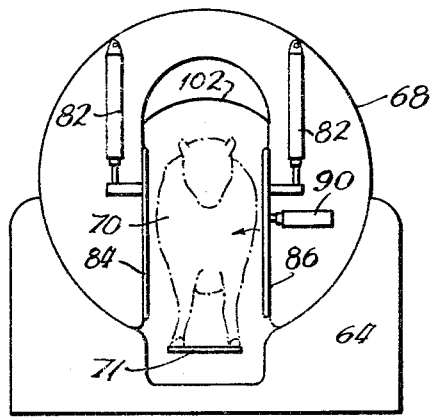

FIGURE 14 is a view similar to FIGURE 13 and shows another stage in the operation of the cradle.

FIGURES 15 to 20 inclusive are diagrammatic views in end elevation of the cradle and show different stages in the operation thereof, and FIGURE 21 is a view in sectional end elevation of an animal-reverting device and is taken on the line 21—21 of FIGURE 2.

The apparatus shown in FIGURES 1 and 2 briefly comprises an endless elevated monorail track A supporting a plurality of wheeled carriages, generally designated B, and each provided with four suitably spaced leg clamps for supporting a sheep in inverted condition.

The animals are individually inverted by means of a cradle, generally designated C, and located at or near a loading station arranged below the path of movement of the carriages.

The animals pass to the cradle from a single-file conveyor race D connected by a junction race E to a wider forcing race F which the animals enter from an adjacent yard G through a gateway H, the purpose of these races being to ensure that there is no delay in the entry of successive animals to the cradle C.

After each sheep has been attached to a carriage, the latter, with the animal suspended therefrom, is moved to a plurality of successive positions or stations, designated I, J, K, L and M at which the requisite operations are carried out, while finally, the animal is released at an unloading station N where it falls onto a reverting device generally designated O by which it is directed, feet-first, onto the floor of an exit yard P.

The number of the treatment positions or stations and the nature of the treatment apparatus depends upon the particular operations to be carried out. For example, the wool may be removed manually from the head and belly of each animal at station I, while at station J, the wool is similarly removed from the four legs and at station K, the fleece is removed either manually or by automatic shearing apparatus from the back and sides of the animal. At station L, the animal is vaccinated manually or automatically, while finally, at station M, the shorn animal is subjected to a spraying operation.

The said treatment apparatus does not however, form part of the present invention, and is not described herein.

Provision is made for driving the carriages along the monorail track at a suitable speed and each carriage may be independently disconnected from the drive means in order that they may be stopped where desired, e.g. at the loading and shearing stations. On the other hand, the vaccinating, spraying and unloading operations may be carried out, while the carriages are in motion.

The construction and operation of various parts of the apparatus are hereinafter further described.

Conveyor system

The endless elevated track designated A in FIGURES 1 and 2 is arranged in a horizontal plane and when viewed in plan, is of elongated rectangular shape with its sides and ends merging together by smooth curves. This track A consists of a monorail of I shape in cross-section, as shown in FIGURES 4 and 5, and is secured to a plurality of transverse beams 10 supported at a suitable height above the floor by pairs of columns 11.

The length of the track depends upon the required number and spacing of the treatment stations to be arranged between the loading station A and the unloading station N.

The monorail track A supports the required number of carriages (FIGURES 3 to 10 inclusive), each of which comprises a frame bar 12 arranged longitudinally below and parallel to the track and provided with two suitably spaced hanger members 14 which extend upwardly therefrom and each of which is pivotally connected at its upper end to the lower ends of a corresponding pair of brackets 16 carrying opposed track wheels 16a which run on the lower flanges of the monorail.

Each hanger member 14 is of composite construction and comprises a swivel 14a which enables the upper part 14b thereof to turn about the vertical axis of the lower part and so permit the carriage to negotiate the curved corners of the rectangular track.

And endless roller chain 17 arranged parallel to and within the path of movement of the hangers passes around four sprockets 17a arranged at the corners of the structure and one hanger of each carriage is fitted with a laterally arranged and axially movable spring-loaded drive pin 18 which, when projected, enters the space between two adjacent rollers of the chain, whereby the latter is caused to propel the carriage along the track. For this purpose, the pitch of the sprocket teeth is twice that of the lines of the chain which is supported between the sprockets by channel section members 16a. More particularly, the pin 18 is urged towards its projected position by a spring and is retractable in opposition to the latter by a manually operable lever 19. Thus, each carriage may be independently connected to and disconnected from the drive chain which, when the apparatus is in use, is driven at a constant speed by one of the sprockets 17.

The aforesaid longitudinal frame bar 12 of each carriage is of hollow box shape in cross-section and accommodates an axially disposed screw-threaded spindle 20 which is mounted in bearings in the opposite ends of the bar and one end of this spindle projects from the bar and is fitted with a hand crank 21.

A head member 22 in the form of a flat metal plate depends vertically from each end of the frame bar and its upper end extends into the latter through a longitudinally disposed slot in the lower side of the hollow bar and is secured to a corresponding nut 23 which engages the threaded spindle 20.

The screw threads on the opposite end portions of the spindle are of opposite hands, so that by turning the crank 21, the two depending head members are caused to move towards or from each other.

Each head member supports two horizontal clamp arms 25 arranged on opposite sides thereof, each arm having its inner end pivotally connected by a vertical pin 26 to corresponding bearing lugs on the head piece. The two arms are formed with intermeshing gear segments 27, whereby they are constrained to move angularly in unison and each pair of arms may be locked in their required adjustment positions by a manually operated locking lever 28.

The free outer end of each clamp arm is swivelly connected to one jaw 30 of a leg clamp, the jaw being approximately of semi-circular shape in cross-section and being lined internally with sponge-rubber or other equivalent material.

Each jaw 30 coacts with a similarly formed jaw 31 which is swivelly mounted on the free end of an arm 32 which has its opposite inner end connected by a vertical pivot pin 33 to the respective clamp arm 25. The inner end of each arm 32 is formed with ratchet teeth 34 which are engaged by a spring-loaded pawl 35 pivoted to the respective arm 25 so that each clamp is automatically held in its closed position until the respective pawl is released by depressing a vertical push rod 36 slidably mounted in an axial hole in the pivot pin 26 of the respective clamp arm 25. The lower end of each push rod 36 rests on one arm of a spring-loaded bell crank lever 37 which has its opposite arm arranged to displace the pawl 35 when the push rod is depressed.

The four push rods are depressed in unison at the unloading station N by means of vertically movable striker bars 38 arranged longitudinally on opposite sides of the path of movement of the carriage hangers 14. These striker bars are suspended from air cylinders 40, and a valve 41 for controlling the latter is arranged to be operated at the unloading station by an arm 42 which projects laterally from one hanger of each carriage.

The striker bars 38 are normally maintained in their raised positions in which they are disposed above the level of the upper ends of the push rods 36, but as each successive carriage reaches the unloading station, the carriage arm 42 engages the control valve 41, whereby the striker bars are lowered by the air cylinders to cause the four push rods 36 to be depressed simultaneously to release the corresponding leg clamps after which, the striker returns to its normal raised position.

Each carriage therefore is provided with four leg clamps arranged in two transversely opposed pairs. The distance between each transverse pair of clamps may be varied to suit the size of the animals by manually moving one of the clamp arms 25 inwardly or outwardly, it being understood that the coacting arm is constrained to move similarly and in unison therewith. The arms are then locked in the required positions by the lever 28. Likewise, the distance between the front and rear pairs of leg clamps may be decreased or increased by moving the head members 22 towards or from each other by the crank 21, so that the carriages are adjustable to suit animals of different sizes.

Preferably and as shown in FIGURE 1, the distance between the clamps for the front and rear legs of the animals exceeds the normal distance between the legs, as it is found that the animal hangs comfortably in this position while being prevented from making violent muscular movements.

One end of the carriage and preferably the leading end thereof is provided with a retractable head rest for the animal. This head rest comprises an arm 43 which is pivoted to the respective head member 22 by a pin 44 and a tension spring 45 constantly urges the arm forwardly and upwardly to its retracted position.

A ratchet segment 46 secured to the inner end of the arm 43 is engaged by a spring-loaded pivoted pawl 47 and the latter has a tail which extends below an abutment 36a on the adjacent push rod 36 and is also connected by a Bowden cable 48 to a manually operable release button 49.

In operation, each carriage is moved into position above the inverting cradle C and the four legs of an animal inverted therein are secured to the carriage by the described leg clamps, the spacings of which are, if necessary, adjusted in the aforesaid manner. The head rest, which at this time is in its retracted position, is then swung down manually and in opposition to the tension spring 45 to the required position below the head of the animal, while movement thereof in the opposite direction is prevented by the pawl 47. However, if an excessive downward movement should be inadvertently imparted to the head rest, the pawl may be released by operation of the button 49 to permit of the required reverse movement.

Finally, when the several push rods 36 are depressed in the aforesaid manner at the unloading station, the tail of the pawl 47 is depressed by the abutment 36a on the adjacent push rod, so that as the leg clamps are being opened, the head rest is automatically moved forwardly and upwardly to its retracted position so as to permit the animal to drop without obstruction by the head rest.

*Inverting cradle*

The inverting cradle generally designated C in FIGURES 1 and 2 and which is arranged at the loading station below the path of movement of the carriages, is shown in FIGURES 11 to 20 inclusive and comprises a base frame which normally is fixed in position, though it may be portable, in which case, it may be fitted with castor wheels.

This base frame comprises longitudinally extending members 60 arranged close to the floor and which are secured at their ends to transverse members 62 which project laterally from each side and each of which supports an upstanding frame member 64. The two upstanding frame members at each end are disposed in transverse alignment and at one end at least are spaced sufficiently apart to permit of the entry of a sheep.

Each pair of frame members 64 at each end of the base carries a plurality of rollers 66 which support the corresponding end of a longitudinally extending horizontal rotary frame and which for this purpose, lie on a circle struck from the axis of the latter.

The rotary frame comprises two similar end rings 68 which may for example, be about 4 feet in diameter and which are rigidly connected by spaced longitudinal members 69 and the outer periphery of each ring is formed with a circumferential locating groove to receive the corresponding supporting rollers 66.

Each ring 68 of the rotary frame is interrupted as shown at 68a to permit of the entry or exit of the animals and the rollers 66 on each frame member 64 are so spaced that one roller at least engages the respective end ring as the gap in the latter is passing over them. Each of the said end rings has a sheet metal or other covering formed with a radial opening 70 which registers with the gap 68a in the respective ring and which is disposed vertically when the rotary frame is in the sheep entry position shown in FIGURES 11, 12 and 15. Thus an animal may pass into the interior of the rotary frame through the access opening 70 in the entry end thereof.

An endless horizontal belt conveyor 71 arranged at the bottom of the single-file race, later to be described, extends forwardly into the entry end of the cradle between the respective end members 64 on the base and centrally below the end rings of the rotary frame so that the rotation of the latter is not obstructed. The upper stretch of this conveyor thus forms the floor of the cradle, and the conveyor is preferably power-operated under the control of a foot pedal or the like, so that at each operation of the pedal, the leading animal in the single-file race is moved forwardly to the requisite position within the cradle. One or more decoy animals are preferably placed in a pen (not shown) arranged beyond and in alignment with the cradle to induce the animals to enter the latter freely.

The rotary frame is provided with a diametrically slidable crush frame, whereby, after an animal has been firmly gripped therein as hereinafter described, it may be raised clear of the conveyor 71 or other suport before it is inverted by turning the rotary frame.

The said slidable crush frame comprises spaced parallel end members 74 which engage corresponding guides 76 on the rotary frame and which are rigidly connected by spaced longitudinal mmebers 78. When the cradle is in position to receive an animal, the said members 74 and guides 76 are arranged vertically and the lower ends of the former preferably rest on locating abutments 80 on the base frame as shown in FIGURE 11.

The slidable crush frame is actuated by four double acting pneumatic or hydraulic cylinder and plunger units 82 arranged vertically and one near each of the end members 74, each unit being pivotally connected at one end to the rotary frame and at its opposite end to the respective end member 74. Alternatively, the crush frame may be actuated by any other suitable means.

The crush frame is provided internally with two spaced crush walls 84 and 86 which are arranged vertically when in the sheep entry position. The wall 84 is normally fixed in position, but is preferably adjustable towards and from the centre of the cradle to suit the size of the animals to be handled.

The other crush wall 86 is movable towards and from the fixed wall 84 so that an animal may be firmly held therebetween. For this purpose, this wall 86 is supported by a linkage which is operable, preferably by a pneumatic cylinder and plunger unit 90 as shown to enable the said wall to be moved inwardly and outwardly while remaining parallel to the other wall 84.

More particularly, the crush frame is provided outwardly of the movable wall 86 with two spaced parallel shafts 92 which are arranged vertically when the cradle is in the animal-receiving position and which are connected together by a linkage 94 whereby they are constrained to turn in unison. Each of these shafts is provided along its length with two or more radial arms 96, each of which is pivotally connected at its free end to a corresponding projection on the back of the movable wall 86.

Figure 16:
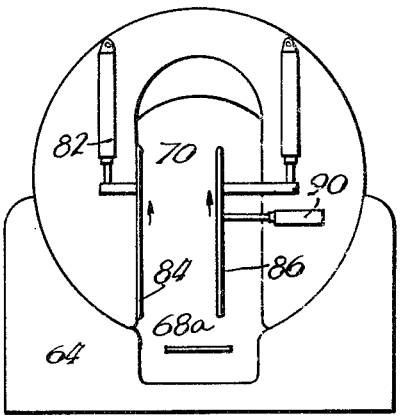

One of the shafts 92 is provided with a further radial arm 98 which is pivotally connected by a pneumatic cylinder and plunger unit 90 to one end member 84 of the crush frame. Consequently, when air under pressure is directed into one end of the cylinder, the two shafts 92 are turned in unison to cause the movable wall 86 to be moved inwardly so that an animal is gripped firmly between it and the fixed wall 84 as shown in FIGURE 16.

Figure 17:
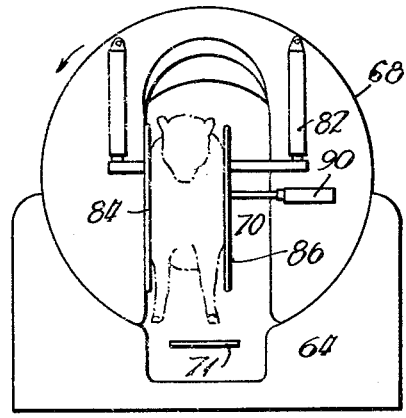

After an animal is gripped between the walls 84 and 86, the crush frame is moved vertically upwards within the rotary frame by the mechanism above described and as shown in FIGURE 17, whereby the animal is lifted clear of the conveyor 71 on which it was previously standing.

Figure 18:
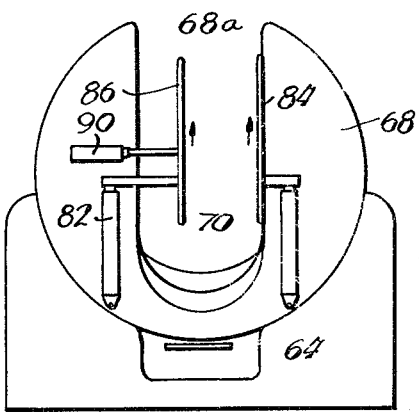
Figure 19:
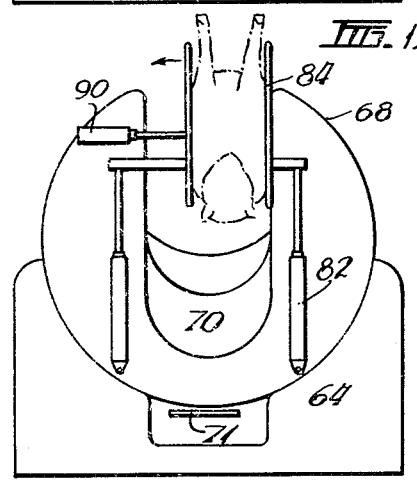
Figure 20:
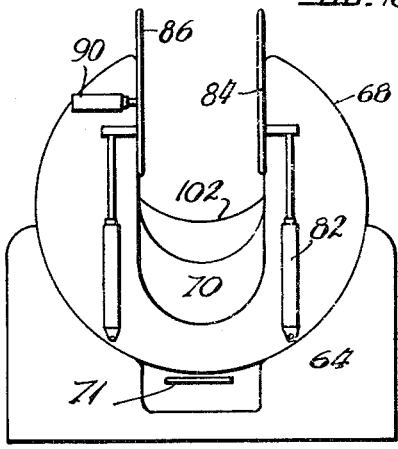

The rotary frame, together with the crush frame is then turned through an angle of 180°, either manually or by pneumatic or other suitable mechanism, thereby to invert the animal, as shown in FIGURE 18. The crush frame is then moved vertically upwards as shown in FIGURE 19, so that the legs of the animal are raised to a convenient position for attachment to the leg clamps of the respective carriage disposed thereabove after which, the animal is released from the crush frame by moving the wall 86 outwardly as shown in FIGURE 20.

Preferably, a further grille 102 is arranged horizontally above the crush walls in order to provide support for the back of the animal when the cradle is inverted, the said further grille being preferably adjustable in position to suit the size of the animals.

*Reverting device*

As previously explained, a reverting device is arranged to return the successive animals feet-first onto the floor as they are successively discharged from the carriages at the unloading station.

The reverting device which is shown in FIGURES 2 and 21 comprises an elongated fixed slide 150 of convex shape in cross-section having its upper end arranged below and spaced from a normally horizontal table 152 which has one of its longitudinally extending side edges pivotally connected to a vertically adjustable supporting frame by a rod 153. The table is provided with a vertical wall 154 at the pivoted side thereof and with rearwardly projecting arms 155 carrying weights 156 by which the table is normally maintained in its described horizontal position, which is determined by suitably arranged stops.

When each carriage is located at the unloading station, the four leg clamps are simultaneously released in the manner previously described, so that the suspended animal falls on its back onto the pivoted table. The table then swings downwards until its free edge rests on the slide as shown in broken lines in FIGURE 21, and the wall 154 which moves in unison with the table ensures that the animal rolls towards the slide, so that it gravitates feet-first onto the floor of the exit yard. Preferably and as shown, a shallow ledge 157 is provided at the free edge of the pivoted table to assist in turning the animal onto its side on the slide.

The invention therefore provides apparatus by which, animals, while suitably restrained and supported in the inverted position, are moved to a series of spaced treatment positions. Some or all of the treatment operations may be performed manually, while others may be performed automatically or semi-automatically and in either case, the rate of treatment may be appreciably greater than is possible or practicable with existing methods.

I claim:

1. Apparatus for facilitating the treatment of sheep and other animals comprising an endless track arranged substantially horizontally in an elevated position, a plurality of carriages supported on the track for movement in succession therealong, means operable to move the carriages along the track, four spaced and releasable leg clamps on each carriage so arranged that an animal may be suspended therebelow by its legs, animal-inverting means arranged below the path of movement of the carriages to facilitate the attachment of an animal to each carriage as the latter is positioned thereabove, means for directing the animals in succession to the inverting means, animal-reverting means arranged below the path of movement of the carriages at a position spaced from the said inverting means, the said reverting means comprising a slide aranged to direct an animal feet-first onto the floor, and means operable to release, substantially simultaneously, the several leg clamps of each carriage, whereby an animal supported thereby is caused to fall onto the said reverting means.

2. Apparatus according to claim 1, wherein each carriage comprises two end members which are spaced apart lengthwise of the track and including two laterally opposed and oppositely inclined arms pivotally mounted on each end member about substantially vertical axes and means operable to lock the said pivoted arms in alternative adjustment positions and wherein one of the said leg clamps is carried by each of the said pivoted arms.

3. Apparatus according to claim 1, including a depending arm pivotally mounted about a transverse axis on one end portion of the carriage, a head rest on the lower end portion of the arm, resilient means urging the said arm upwardly to a retracted position, releasable means for retaining the said arm in its operative position to support the head of an animal, and means operable to release the said retaining means.

4. Apparatus according to claim 1, wherein the said release means for the leg clamps comprises a vertically disposed depressible member individual to each leg clamp and including vertically movable means arranged at the requisite position adjacent to the said track for engagement with the said depressible members.

5. Apparatus according to claim 1, wherein said animal-inverting means comprises a cradle having a base, a frame supported on the base for rotation about a substantially horizontal axis and having an animal entry opening in one end thereof, and laterally movable means arranged within the rotary frame and adapted to grip an animal therebetween, the said rotary frame being interrupted, whereby an animal inverted thereby may be connected to one of the said carriages and removed thereby from the said frame.

6. Apparatus for facilitating the treatment of sheep and other animals comprising a plurality of carriages arranged in spaced relation around an elevated endless path, supporting means therefor, means operable to move said carriages in succession around said elevated path, four spaced releasable leg clamps on each carriage whereby an inverted animal may be suspended therefrom, animal inverting means arranged below the said endless path to facilitate the attachment of an animal to each carriage as it is located thereabove, animal reverting means arranged below the said endless path at a position spaced from the said inverting means, and means operable to release substantially simultaneously the four leg clamps of each carriage as the latter is disposed above said reverting means, whereby the animal drops on its back onto said reverting means.

7. Apparatus according to claim 6, wherein each carriage includes a retractable head rest for an animal supported thereby.

8. Apparatus according to claim 6 wherein the said reverting means comprises a fixed slide and includes a substantially horizontal downwardly tiltable table arranged above the upper end of the slide whereby when an animal is deposited on the table, the latter tilts to discharge the animal onto the slide.

References Cited by the Examiner

UNITED STATES PATENTS

| | | | |
|---|---|---|---|
| 20,585 | 6/58 | Chapman | 119—103 |
| 899,391 | 9/08 | Farrell | 17—24 |
| 988,587 | 4/11 | Morse | 294—79 |
| 1,173,866 | 2/16 | Roberson | 119—158 |
| 1,599,134 | 9/26 | King | 17—1 |
| 1,613,636 | 1/27 | Zohner | 294—79 |
| 2,667,660 | 2/54 | Lentz et al. | 17—44.1 |
| 2,713,326 | 7/55 | Stephenson | 119—19 |
| 2,912,715 | 11/59 | Moss | 17—1 |
| 3,118,174 | 1/64 | Hughes | 17—1 |

ABRAHAM G. STONE, *Primary Examiner.*

CHARLES W. ROBINSON, ARNOLD RUEGG, T. GRAHAM CRAVER, *Examiners.*